United States Patent
Kelnhofer et al.

(10) Patent No.: US 7,922,118 B2
(45) Date of Patent: Apr. 12, 2011

(54) SYSTEM FOR PRODUCING PROCESS AIR

(75) Inventors: Juergen Kelnhofer, Jork (DE); Thomas Scherer, Hamburg (DE)

(73) Assignee: Airbus Deutschland GmbH (DE)

( * ) Notice: Subject to any disclaimer, the term of this patent is extended or adjusted under 35 U.S.C. 154(b) by 631 days.

(21) Appl. No.: 11/573,531

(22) PCT Filed: Aug. 10, 2005

(86) PCT No.: PCT/EP2005/008692
§ 371 (c)(1),
(2), (4) Date: Feb. 9, 2007

(87) PCT Pub. No.: WO2006/015858
PCT Pub. Date: Feb. 16, 2006

(65) Prior Publication Data
US 2009/0095004 A1 Apr. 16, 2009

Related U.S. Application Data

(60) Provisional application No. 60/600,274, filed on Aug. 10, 2004.

(30) Foreign Application Priority Data

Aug. 10, 2004 (DE) .......................... 10 2004 038 860

(51) Int. Cl.
*B64D 11/00* (2006.01)
(52) U.S. Cl. ............ 244/118.5; 62/401; 62/402; 454/71
(58) Field of Classification Search ............... 244/118.5; 62/401, 402, 90; 454/71, 76
See application file for complete search history.

(56) References Cited

U.S. PATENT DOCUMENTS

| | | | | |
|---|---|---|---|---|
| 3,711,044 A | * | 1/1973 | Matulich | 244/118.5 |
| 4,021,215 A | * | 5/1977 | Rosenbush et al. | 62/402 |
| 4,445,342 A | * | 5/1984 | Warner | 62/172 |
| 4,493,195 A | * | 1/1985 | Zalesak et al. | 62/402 |
| 4,665,973 A | * | 5/1987 | Limberg et al. | 165/133 |
| 4,735,056 A | * | 4/1988 | Goodman | 62/172 |
| 5,145,124 A | * | 9/1992 | Brunskill et al. | 244/118.5 |
| 5,333,470 A | * | 8/1994 | Dinh | 62/333 |
| 5,355,690 A | * | 10/1994 | Iritani et al. | 62/184 |
| 5,511,385 A | * | 4/1996 | Drew et al. | 62/172 |
| 5,545,084 A | * | 8/1996 | Fischer et al. | 454/76 |

(Continued)

FOREIGN PATENT DOCUMENTS

DE 10 2004 010 366 A1 3/2004

(Continued)

OTHER PUBLICATIONS

International Search Report PCT/EP2005/008692 dated Oct. 26, 2005 (European Patent Office NL).

(Continued)

*Primary Examiner* — Timothy D Collins
*Assistant Examiner* — Justin Benedik
(74) *Attorney, Agent, or Firm* — Ostrolenk Faber LLP

(57) ABSTRACT

A system for the provision of process air comprises a first cooling system (2) with a first heat exchanger, which is arranged in a channel (3) that serves as a cooling sink, and a cooling system (8), integrated in the first cooling system (2), wherein said cooling system (8) comprises a heat exchanger (9) which is integrated in the channel (3) either upstream or downstream of the first heat exchanger.

8 Claims, 1 Drawing Sheet

U.S. PATENT DOCUMENTS

| | | | |
|---|---|---|---|
| 5,704,218 A * | 1/1998 | Christians et al. | 62/172 |
| 5,899,805 A * | 5/1999 | Dowd et al. | 454/76 |
| 5,911,388 A * | 6/1999 | Severson et al. | 244/118.5 |
| 6,199,387 B1 * | 3/2001 | Sauterleute | 62/87 |
| 6,216,981 B1 * | 4/2001 | Helm | 244/118.5 |
| 6,381,969 B1 * | 5/2002 | Afeiche et al. | 62/87 |
| 6,389,826 B2 * | 5/2002 | Buchholz et al. | 62/172 |
| 6,415,621 B2 * | 7/2002 | Buchholz et al. | 62/402 |
| 6,519,969 B2 * | 2/2003 | Sauterleute | 62/401 |
| 6,526,775 B1 * | 3/2003 | Asfia et al. | 62/402 |
| 6,595,010 B2 * | 7/2003 | Sauterleute et al. | 62/86 |
| 6,655,168 B2 * | 12/2003 | Mitani et al. | 62/402 |
| 6,729,359 B2 * | 5/2004 | Jones | 141/1 |
| 6,739,359 B2 * | 5/2004 | Jones et al. | 141/64 |
| 2002/0152765 A1 | 10/2002 | Sauterleute et al. | 62/401 |
| 2004/0014420 A1 | 1/2004 | Bruno et al. | |
| 2005/0235659 A1 | 10/2005 | Brutscher et al. | |
| 2009/0084896 A1 * | 4/2009 | Boucher et al. | 244/118.5 |

FOREIGN PATENT DOCUMENTS

| | | |
|---|---|---|
| DE | 102004010366 | 9/2005 |
| EP | 1 273 514 A2 | 1/2003 |
| EP | 1273514 | 1/2003 |
| EP | 1 293 426 A2 | 3/2003 |
| EP | 1293426 | 3/2003 |
| EP | 1 375 349 A1 | 1/2004 |
| EP | 1375349 | 1/2004 |
| JP | 2000-517235 | 12/2000 |
| JP | 2003-240375 A | 8/2003 |
| JP | 2003240375 | 8/2003 |
| JP | 2004-197737 | 7/2004 |
| RU | 2 111 152 C1 | 5/1998 |
| RU | 2 168 122 C1 | 5/2001 |
| RU | 2 223 203 C1 | 2/2004 |
| RU | 45711 U1 | 5/2005 |
| WO | WO 98/06480 | 2/1998 |

OTHER PUBLICATIONS

Russian Notice of Allowance, dated Mar. 3, 2009, issued in corresponding Russian Patent Application No. 2007102025/11 (002169), filed Aug. 10, 2005. Total 5 pages.

Japanese Notice of Reasons for Rejection (Office Action), dated Jan. 11, 2011, issued in corresponding Japanese Patent Application No. 2007-525250, and with attached English translation. Total 5 pages.

* cited by examiner

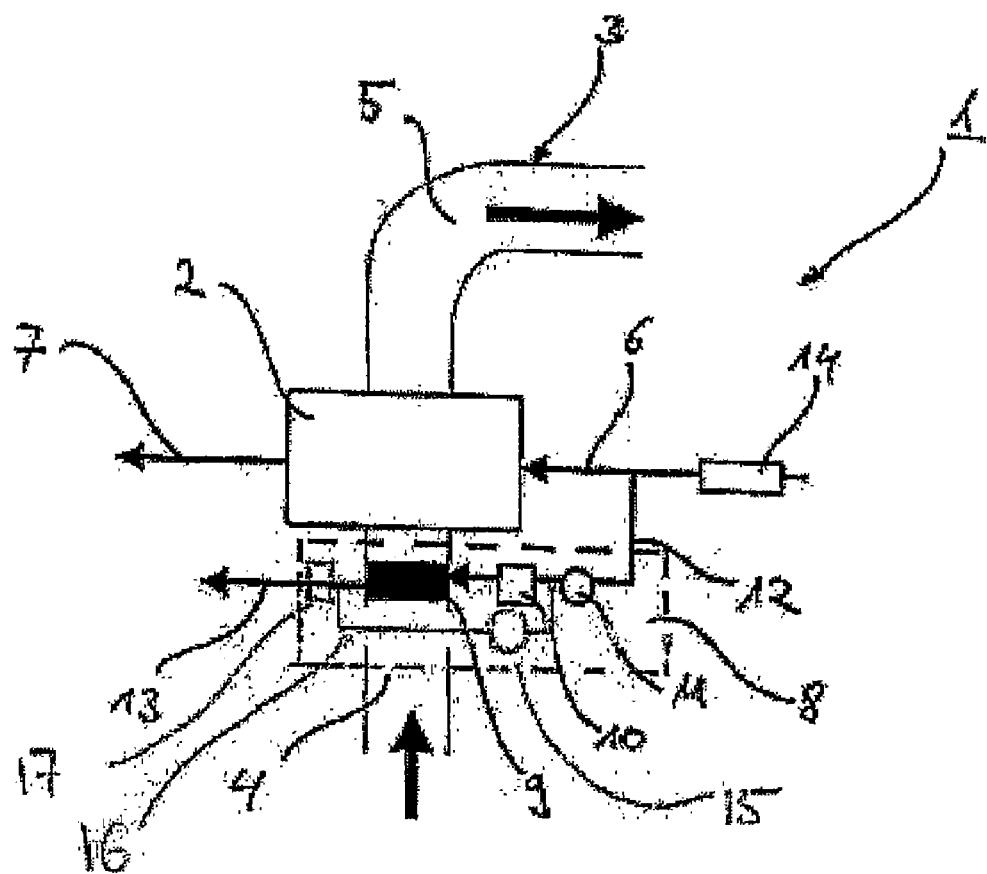
FIG..1

SYSTEM FOR PRODUCING PROCESS AIR

This application claims the benefit of the filing date of U.S. Provisional Patent Application No. 60/600,274 filed on Aug. 10, 2004, the disclosure of which is hereby incorporated herein by reference and of the German Patent Application No. 10 2004 038 860.1 filed on Aug. 10, 2004, the disclosure of which is hereby incorporated herein by reference.

The present invention relates to a system for producing process air, in particular to a system for producing temperature-controlled, highly-compressed process air in an aircraft.

Different systems may be used to produce temperature-controlled, highly-compressed process air in an aircraft. These systems predominantly comprise a heat exchanger and numerous control valves and control sensors for pressure and temperature (wherein the number of said sensors differs depending on the system).

The associated process air is taken from the hot air system (bleed air system) which is either fed by the engines or by the aircraft's auxiliary turbine (APU).

It is for example necessary for the hot process air to be cooled to cold process air and to be relaxed, for the purpose of supplying fresh air to the cabin or the cockpit of an aircraft.

Already existing air cooling systems (whose heat exchangers are based on air-air refrigeration technology or liquid-air refrigeration technology) require a ram-air cooling channel of their own to produce the necessary cooling sink.

However, the provision of such a ram-air cooling channel results in added aircraft weight, increased production expenditure and increased maintenance costs.

Furthermore, the provision of a ram-air cooling channel may lead to an increase in the air resistance of the aircraft. The use of external cooling air results in a moment resistance which has the effect of "negative thrust". "Sucking in" external cooling air, and "blowing out" external cooling air results in disturbances in the overall airflow around the aircraft, which in turn has a negative influence on the overall aircraft resistance.

It may therefore be desirable to provide a system which minimises or almost completely prevents the above-mentioned negative effects on the aircraft.

In the system according to an exemplary embodiment of the invention, a further cooling system is integrated in a channel which serves as a cooling sink of an already existing and installed cooling system.

This integrated cooling system comprises a heat exchanger, corresponding control valves, control sensors, a process-air inlet line and a process-air outlet line, which are integrated in the already existing cooling system such that the process-air inlet line of the integrated cooling system branches off from a process-air inlet line of the already existing cooling system.

Furthermore, the heat exchanger of the integrated cooling system is arranged upstream or downstream of the heat exchanger of the already existing cooling system in the ram-air cooling channel. If the cooling output of the cooling system to be integrated is lower than that of the already existing cooling system, the heat exchanger of the cooling system to be integrated is preferably integrated in the ram-air cooling channel upstream of the heat exchanger of the already existing cooling system. If the cooling output of the already existing cooling system is lower than that of the cooling system to be integrated, then it is preferred to install the heat exchanger of the cooling system to be integrated in a position in the ram-air cooling channel, which position is located downstream of the already existing cooling system.

According to another exemplary embodiment of the invention, an ozone filter (hereinafter also referred to as an ozone converter) is arranged in the process-air inlet line for filtering ozone in the process-air inlet line. E.g. an individual ozone converter is provided for the already existing cooling system and for the cooling system to be integrated. By connecting the process-air inlet line for the cooling system to be integrated so that it is positioned downstream of the already existing ozone converter of the existing cooling system, there may be no need to install it for the cooling system to be integrated. This may result in savings in both weight and cost.

According to another exemplary embodiment of the invention, for example an aircraft air conditioning system or a ventilation system for aircraft regions that are not pressurised constitutes an already existing cooling system.

The system according to the invention may for example be used in an A380 for operating the OBIGGS system. Further A380 applications for the therapeutic oxygen system or for pressurising the fresh water system may be possible.

Because of the special integration concept according to the invention, i.e. the integration in an already existing cooling system, at the aircraft level it is possible to achieve savings in weight and in additional work and at the same time reduce the air resistance or drag.

Below, a preferred embodiment of the system according to the invention is described with reference to the enclosed FIG. 1.

FIG. 1 shows a diagrammatic view of a system for providing temperature-controlled highly-compressed process air according to an exemplary embodiment of the invention.

The system 1 comprises an already existing air cooling system 2. The cooling system 2 shown in FIG. 1 is based on so-called air-air technology. As an alternative it may also be possible to use a system which is based on liquid-air technology or some other technology.

The cooling system 2, which according to the exemplary embodiment is based on air-air technology, requires a ram-air cooling channel 3. This ram-air cooling channel 3 comprises a ram-air cooling channel inlet 4 and a ram-air cooling channel outlet 5; in the already existing air cooling system 2 said ram-air cooling channel 3 is used for producing a necessary cooling sink in order to cool hot process air down to cold process air.

As shown in FIG. 1, the cooling system 2 comprises a process-air inlet line 6, by way of which hot process air, for example from the engines, is fed to the cooling system 2. By means of the heat exchanger (not shown) contained in the cooling system 2, and the ram-air cooling channel 3, which serves as a cooling sink, this hot process air is transformed into cold process air in order to be issued as cooled highly-compressed process air by way of a process-air outlet line 7 from the cooling system 2 for further use at corresponding destinations.

As shown in FIG. 1, the system 1 comprises a further (integrated) cooling system 8, comprising a heat exchanger 9, a control sensor 10 and a control valve 11 for controlling the quantity of process air. This integrated cooling system 8 is integrated in the already existing cooling system 2 such that according to the preferred embodiment the heat exchanger 9 of the integrated cooling system 8 is arranged upstream in the ram-air cooling channel 3 of the cooling system 2.

Furthermore, a control valve 15 for controlling bypass process air for temperature control is provided for the cooling system 8 and/or the process air. Reference number 16 designates a bypass line for process air. A control sensor 17 is provided for pressure control and temperature control for the cooling system 8 and/or the process air.

According to the exemplary embodiment, as shown in FIG. 1, it is important that the heat exchanger 9 of the cooling system 8 to be integrated is installed upstream of the heat exchanger (not shown) of the already existing cooling system 2 in the ram-air cooling channel, because the cooling output of the integrated cooling system 8 is lower than that of the already existing cooling system 2. If the cooling performance of the cooling system 2 is lower than that of the cooling system 8 to be integrated, then installation of the heat exchanger 9 of the cooling system to be integrated preferably takes place downstream of the heat exchanger of the already existing cooling system 2 in the ram-air cooling channel 3.

As shown in FIG. 1, the cooling system 8 to be integrated comprises a process-air inlet line 12 by way of which the cooling system 8 is supplied with hot process air. The process-air inlet line 12 of the cooling system 8 may be, e.g. connected to the process-air inlet line 6 of the already existing cooling system 2.

By way of a process-air outlet line 13 the integrated cooling system 8 issues temperature-controlled highly-compressed cold process air for further use at corresponding destinations.

As shown in FIG. 1, the system 1 further comprises an ozone converter 14. Said ozone converter 14 may be arranged in such a way that hot process air, for example from the engines, is ozone filtered before it is supplied, by way of the process-air inlet line 6 to the already existing cooling system 2, and by way of the process-air inlet line 12 to the integrated cooling system 8. Providing an ozone converter 14 may be necessary when the cold process air, which has been cooled by the cooling systems 2, 8, is used as a fresh-air supply to the cabin and the cockpit. Especially for use with the OBIGGS system (not shown) it is necessary to provide ozone-free process air, because otherwise the air separation module (not shown) would be damaged.

Although, above, a preferred embodiment of the invention for use in an aircraft is described, it goes without saying that application may also be possible in other areas, for example in railway equipment, a motor vehicle etc., provided a cooling system exists therein which comprises a channel which is used as a cooling sink, in which areas a further cooling system according to the invention may be integrated.

Moreover, it may be possible to not only install (integrate) one further cooling system into an already existing cooling system in the way according to the invention, but to install (integrate) a plural number of further cooling systems.

According to an exemplary embodiment of the invention as shown in FIG. 1, it may be possible to integrate a further cooling system into an already existing cooling system, wherein an increase in weight of the vehicle may virtually be prevented because the new cooling system is integrated into an already existing ram-air cooling channel. Furthermore, in the exemplary embodiment described above, additional expenditure in the production of the aircraft may virtually be prevented because there is no need to install a further ram-air cooling channel. Moreover, increased expenditure for maintenance may virtually be prevented because there is no need to install any further systems in the aircraft. Finally, according to the exemplary embodiment, as shown in FIG. 1, increase in the air resistance or drag of the aircraft can virtually be compensated for. While external cooling air is still used (moment resistance still occurs), as a result of integration into an already existing ram-air cooling channel the negative influences on "sucking in" and "blowing out" external cooling air may however be virtually prevented.

LIST OF REFERENCE NUMBERS

1 System
2 Existing cooling system
3 Ram-air cooling channel
4 Ram-air cooling channel inlet
5 Ram-air cooling channel outlet
6 Process-air inlet line
7 Process-air outlet line
8 Further cooling system (cooling system to be integrated)
9 Heat exchanger of the cooling system to be integrated
10 First control sensor
11 First control valve
12 Process-air inlet line
13 Process-air outlet line
14 Ozone converter
15 Second control valve
16 Bypass line for process air
17 Second control sensor

The invention claimed is:

1. A system for providing process air for an On-Board Inert Gas Generation (OBIGG) system and fresh air for a cabin of an aircraft having at least one ram air channel, the system comprising:
    a first cooling system with a first process-air inlet line, and a first heat exchanger; and
    a second integrated cooling system integrated in the first cooling system, the second integrated cooling system comprising a second process-air inlet line branching off from the first process-air inlet line, and a second heat exchanger; and
    the first heat exchanger and the second heat exchanger are arranged in the ram air channel that serves as a cooling sink,
    wherein the system is configured and operative to deliver cooled process air to the OBIGG system.

2. The system of claim 1, wherein the second integrated cooling system comprises the second heat exchanger, corresponding control valves, control sensors, second process-air inlet line and a process-air outlet line, which are integrated in the first cooling system.

3. The system of claim 2, wherein
    the upstream or downstream arrangement of the second heat exchanger in the ram air channel depends on the cooling performance of the second integrated cooling system relative to the cooling performance of the first cooling system.

4. The system of claim 1, wherein
    the upstream or downstream arrangement of the second heat exchanger in the ram air channel depends on the cooling performance of the second integrated cooling system relative to the cooling performance of the first cooling system.

5. The system of claim 1, comprising an ozone converter, which is arranged upstream of the second process-air inlet line of the second integrated cooling system, for filtering ozone in supplied hot process air.

6. The system of claim 1, wherein the first cooling system is at least one of previously installed air conditioning system and a previously installed ventilation system.

7. The system of claim 1, wherein the first cooling system and the second integrated cooling system are based on at least one of liquid-air technology and air-air technology.

8. The system of claim 1, further comprising a bypass line for process air.

* * * * *